United States Patent
Shibata et al.

(10) Patent No.: US 11,680,659 B2
(45) Date of Patent: Jun. 20, 2023

(54) ELECTRICALLY DRIVEN ACTUATOR FOR OPENING AND CLOSING VALVE, AND METHOD FOR DRIVING ELECTRICALLY DRIVEN ACTUATOR FOR OPENING AND CLOSING VALVE

(71) Applicant: MOOG JAPAN LTD., Kanagawa (JP)

(72) Inventors: Naritoyo Shibata, Hiratsuka (JP); Akihisa Miyajima, Hiratsuka (JP); Hidekazu Shitamichi, Hiratsuka (JP)

(73) Assignee: MOOG JAPAN LTD., Kanagawa (JP)

( * ) Notice: Subject to any disclaimer, the term of this patent is extended or adjusted under 35 U.S.C. 154(b) by 193 days.

(21) Appl. No.: 16/982,609

(22) PCT Filed: May 27, 2019

(86) PCT No.: PCT/JP2019/020795
§ 371 (c)(1),
(2) Date: Sep. 21, 2020

(87) PCT Pub. No.: WO2020/054136
PCT Pub. Date: Mar. 19, 2020

(65) Prior Publication Data
US 2021/0018111 A1 Jan. 21, 2021

(30) Foreign Application Priority Data
Sep. 11, 2018 (JP) .............................. JP2018-170077

(51) Int. Cl.
*F16K 31/04* (2006.01)
*F16K 31/50* (2006.01)
*F16K 15/02* (2006.01)

(52) U.S. Cl.
CPC ............ *F16K 31/047* (2013.01); *F16K 31/04* (2013.01); *F16K 31/50* (2013.01); *F16K 31/508* (2013.01); *F16K 15/025* (2013.01)

(58) Field of Classification Search
CPC ........ F16K 31/047; F16K 31/04; F16K 31/50; F16K 31/508; F16K 15/025
See application file for complete search history.

(56) References Cited

U.S. PATENT DOCUMENTS 4,928,919 A * 5/1990 Daicho .................. F16K 1/305
251/297
5,832,944 A 11/1998 Lindner
(Continued)

FOREIGN PATENT DOCUMENTS

| JP | H01-203646 A | 8/1989 |
| JP | 2000-039082 A | 2/2000 |

(Continued)

OTHER PUBLICATIONS

International Search Report issued in PCT/JP2019/020795; dated Jul. 30, 2019.

(Continued)

*Primary Examiner* — Patrick C Williams
(74) *Attorney, Agent, or Firm* — Studebaker & Brackett PC

(57) ABSTRACT

An electrically driven actuator for opening and closing a valve comprises: an electric motor (1); a movable plate (8), to which a valve body is connected; a conversion mechanism (3) configured to convert a rotational motion of the electric motor (1) to a linear motion; a first biasing member (11) configured to bias the movable plate (8) toward a first direction; and a second biasing member (12) configured to bias the conversion mechanism (3) toward a second direction. The valve body is to be opened when a part of the conversion mechanism (3) linearly moves to move the movable plate (8) toward the second direction, and is to be closed when the first biasing member (11) biases the movable plate (8) toward the first direction. The conversion (Continued)

mechanism (3) is configured to be displaced relative to the movable plate (8) in a state in which the valve body is closed.

16 Claims, 10 Drawing Sheets

(56) References Cited

U.S. PATENT DOCUMENTS

| | | | | |
|---|---|---|---|---|
| 6,537,040 | B2* | 3/2003 | Herrmann | F04B 1/0404 |
| | | | | 417/440 |
| 8,636,262 | B2 | 1/2014 | Schade et al. | |
| 2011/0114860 | A1 | 5/2011 | Schade et al. | |
| 2011/0308619 | A1* | 12/2011 | Martino | E21B 34/02 |
| | | | | 251/65 |
| 2012/0256111 | A1* | 10/2012 | Hoang | E21B 34/06 |
| | | | | 251/321 |
| 2013/0263955 | A1* | 10/2013 | Hirota | F16K 11/10 |
| | | | | 137/636 |
| 2015/0014559 | A1* | 1/2015 | Vrolijk | G05D 16/202 |
| | | | | 251/129.11 |
| 2016/0298577 | A1* | 10/2016 | Kimoto | F02M 25/0854 |
| 2017/0058633 | A1* | 3/2017 | Elliott | E21B 34/02 |

FOREIGN PATENT DOCUMENTS

| | | |
|---|---|---|
| JP | 2005-054902 A | 3/2005 |
| JP | 2009-228689 A | 10/2009 |
| JP | 2010-025134 A | 2/2010 |
| JP | 2010-106999 A | 5/2010 |
| JP | 2013-511006 A | 3/2013 |
| WO | 2010/050609 A1 | 5/2010 |

OTHER PUBLICATIONS

The extended European search report issued by the European Patent Office dated May 24, 2022, which corresponds to European Patent Application No. 19860765.7-1015 and is related to U.S. Appl. No. 16/982,609.

* cited by examiner

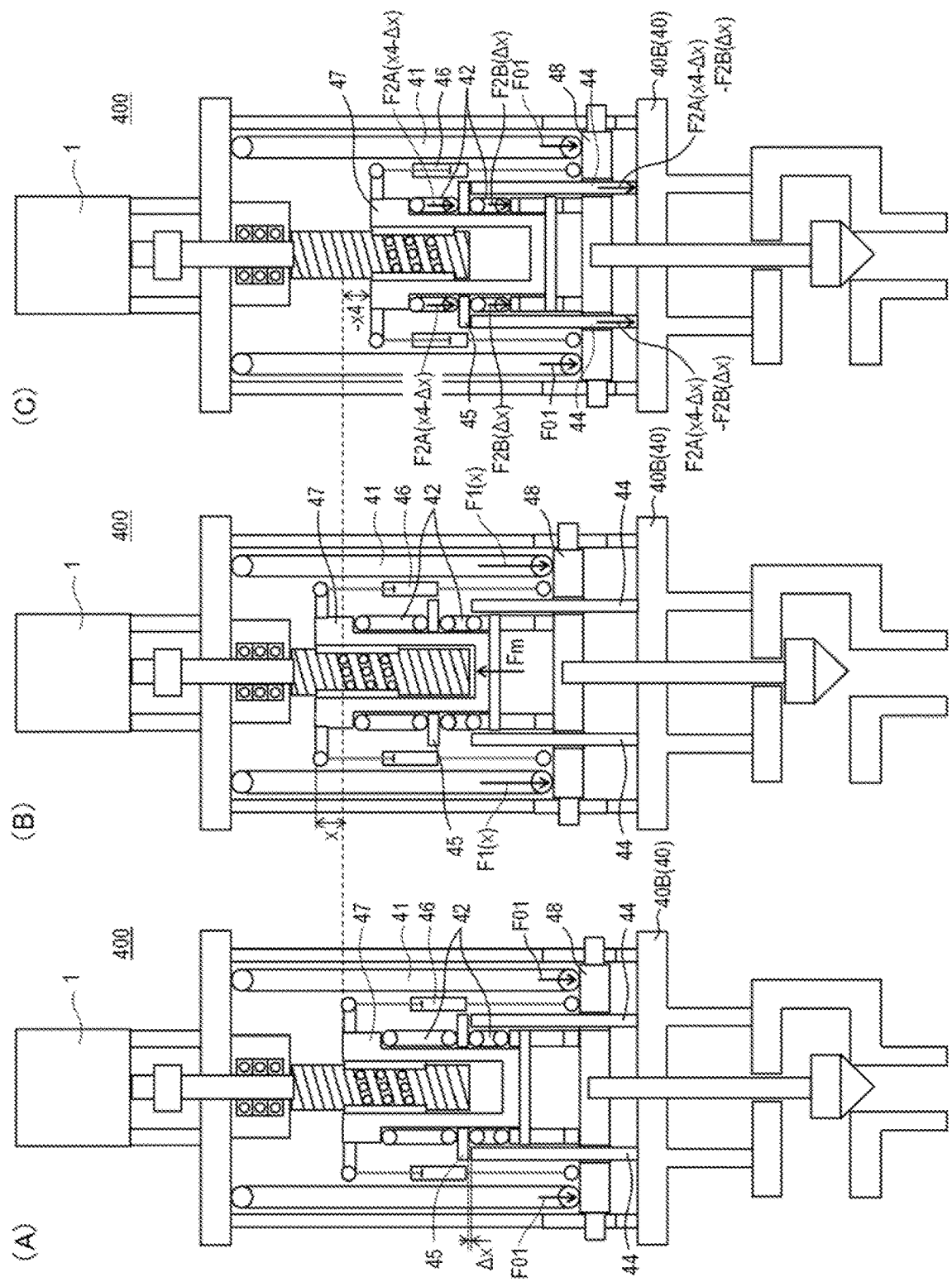

ELECTRICALLY DRIVEN ACTUATOR FOR OPENING AND CLOSING VALVE, AND METHOD FOR DRIVING ELECTRICALLY DRIVEN ACTUATOR FOR OPENING AND CLOSING VALVE

TECHNICAL FIELD

The present invention relates to an electrically driven actuator for opening and closing a valve, and a method for driving an electrically driven actuator for opening and closing a valve.

BACKGROUND ART

An actuator for opening and closing a fluid valve, which is used for a power generation plant, has a quick-closing (or quick-opening) (failsafe shutdown/open) function for a valve body to immediately shut down a supplied fluid to maintain safety based on a sudden power interruption, a failure detection, an emergency control input, or the like as a trigger. For example, in Patent Literature 1, there is disclosed a fluid valve drive mechanism having a highly reliable failsafe function capable of achieving emergency shutdown of a valve body through use of a strong pressing force.

CITATION LIST

Patent Literature

PTL 1: Japanese Patent Application Laid-Open No. 2010-106999

SUMMARY OF INVENTION

Technical Problem

In recent years, there has been a trend of changing over a type of such fluid valve drive mechanism from a hydraulic type to an electric type. In the hydraulic type, translational components are mainly used, and a brake effect is obtained through adjustment of a flow rate of working oil serving as a drive medium. Thus, there is no fear in that a considerable amount of impact is applied to components at the time of quick closing of the valve body. Meanwhile, in the electric type, a mechanism configured to convert rotational power generated by a motor to a linear motion is used. Thus, when the motor does not generate the power at the time of the quick closing, an equivalent mass obtained by converting rotational inertia of a rotor, a shaft, and the like of the motor to a translational mass is relatively large. There is a problem in that this large equivalent mass generates a considerable amount of impact load at the time of the quick closing of the valve body.

Moreover, as a feature of the mechanism of the electric type, rolling mechanical elements such as a ball screw mechanism (or roller screw mechanism) and a ball bearing are provided, and grease is used to lubricate these mechanical elements. The viscosity of the grease greatly changes depending on an ambient temperature or on whether or not break-in has been executed. Especially when the temperature of the environment is low, and an operation has not been executed for a long period, the viscosity of the grease is considerably increased. A resistance of this viscosity causes generation of a large resistance force at the time of driving the fluid valve drive mechanism, resulting in degradation of responsiveness of a normal operation. Further, there is a problem in that the speed of the quick closing of the valve body by the above-mentioned failsafe function is excessively reduced.

The present invention has been made to solve the above-mentioned problems, and has an object to provide an electrically driven actuator for opening and closing a valve which secures a highly-reliable failsafe function.

Solution to Problem

In order to solve the above-mentioned problems, according to the present invention, there is provided an electrically driven actuator for opening and closing a valve including: an electric motor; a movable plate, to which a valve body is connected; a conversion mechanism configured to convert a rotational motion of the electric motor to a linear motion; a first biasing member configured to bias the movable plate toward a first direction; and a second biasing member configured to bias the conversion mechanism toward a second direction, wherein the valve body is to be opened when a part of the conversion mechanism linearly moves to move the movable plate toward the second direction, and is to be closed when the first biasing member biases the movable plate toward the first direction, and wherein the conversion mechanism is configured to be displaced relative to the movable plate in a state in which the valve body is closed.

Advantageous Effects of Invention

According to the present invention, the electrically driven actuator for opening and closing a valve which secures a highly-reliable failsafe function can be provided.

BRIEF DESCRIPTION OF DRAWINGS

FIG. 7(A) to FIG. 7(C) are schematic views for illustrating an operation of an electrically driven actuator 400 for opening and closing a valve according to a fourth embodiment of the present invention.

DESCRIPTION OF EMBODIMENTS

First Embodiment

Figure 1:
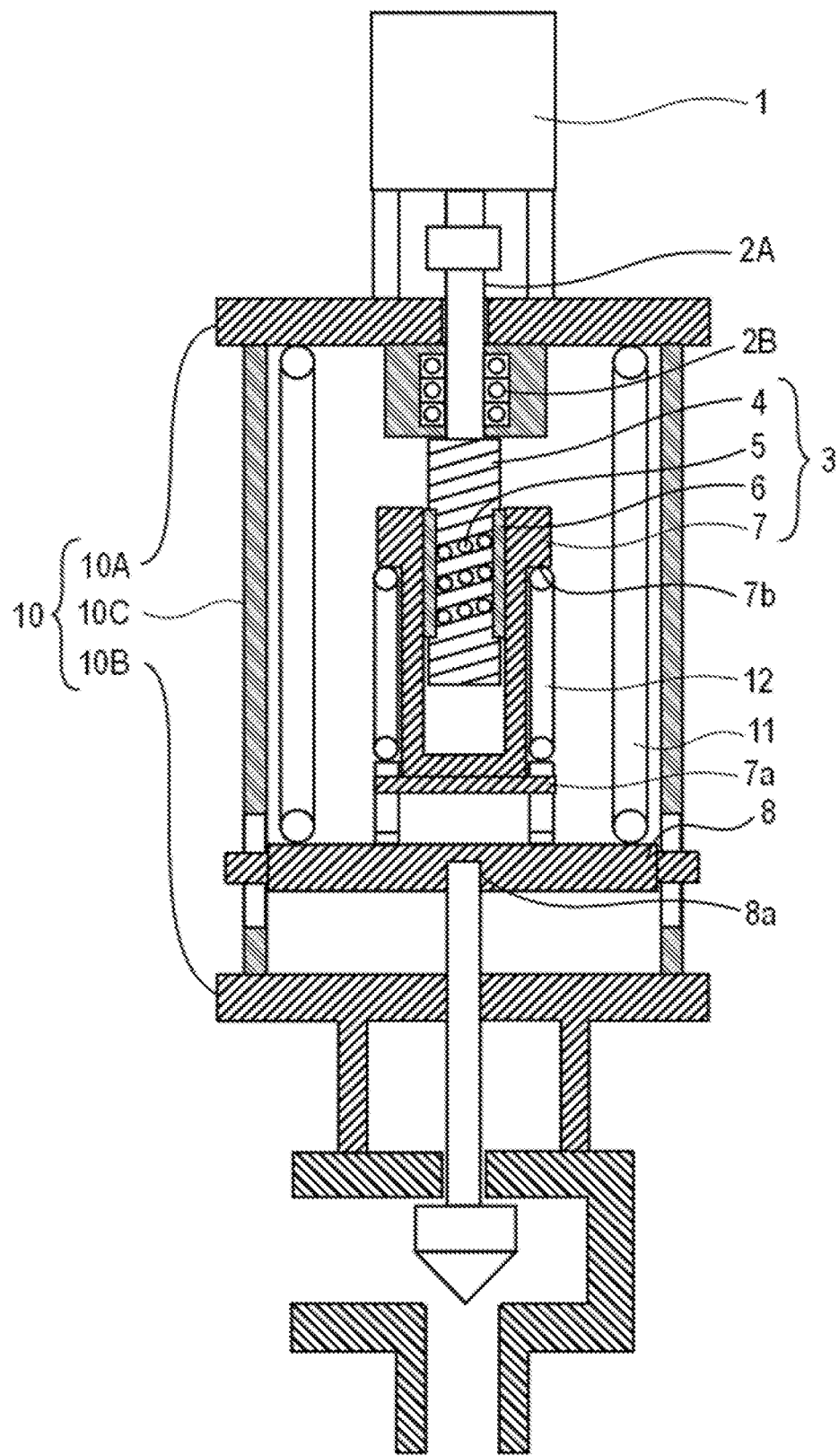
FIG. 1 is a sectional view of an electrically driven actuator 100 for opening and closing a valve according to a first embodiment of the present invention.
Figure 2:
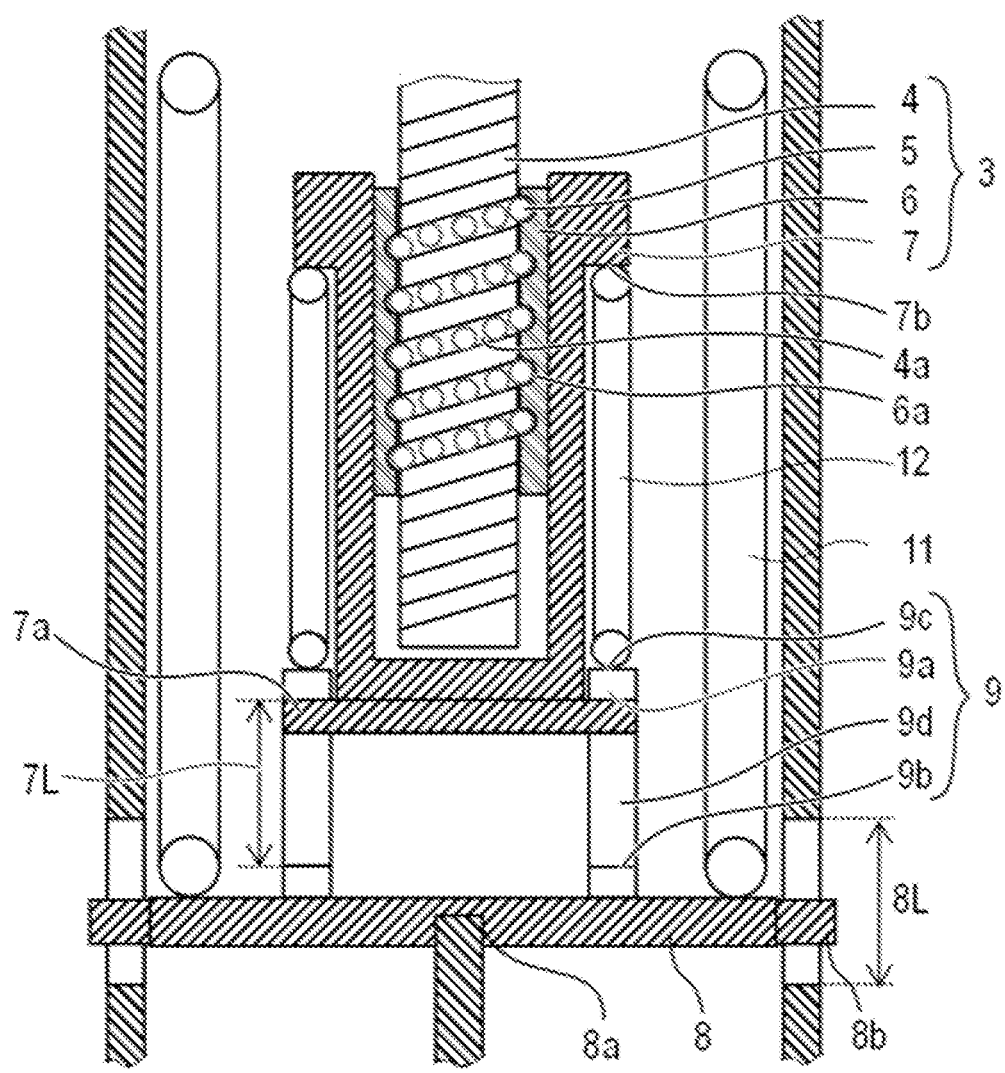
FIG. 2 is an enlarged sectional view of a conversion mechanism 3 of the electrically driven actuator 100 for opening and closing a valve according to the first embodiment of the present invention.

A detailed description is now given of embodiments of the present invention with reference to the accompanying drawings. FIG. 1 is a sectional view of an electrically driven actuator 100 for opening and closing a valve according to a first embodiment of the present invention. FIG. 2 is a sectional view for illustrating details of a conversion mechanism 3 of the electrically driven actuator 100 for opening and closing a valve according to the first embodiment of the present invention.

The electrically driven actuator 100 for opening and closing a valve according to the first embodiment of the present invention includes, for example, an electric motor 1, the conversion mechanism 3, a movable plate 8, a first biasing member 11, and a second biasing member 12. The conversion mechanism 3 is configured to convert a rotational motion of the electric motor 1 to a linear motion. A valve body is connected to the movable plate 8. The first biasing member 11 is configured to bias the movable plate 8. The second biasing member 12 is configured to always bias the conversion mechanism 3.

The electric motor 1 is provided at an upper portion of the electrically driven actuator 100 for opening and closing a valve in a vertical direction. The electric motor 1 is mainly formed of a servomotor and a shaft 2A for taking out an output. The servomotor is configured to generate a rotational driving force through supply of power. The shaft 2A for taking out an output is supported by a ball bearing 2B. The conversion mechanism 3 configured to convert the rotational motion of the electric motor 1 to the linear motion is connected to the shaft 2A. The conversion mechanism 3 is configured to convert a rotational driving force to a linear driving force Fm.

The conversion mechanism 3 configured to convert the rotational motion of the electric motor 1 to the linear motion is formed of a ball screw mechanism, a roller screw mechanism, or the like. As illustrated in FIG. 2, the first embodiment of the present invention includes a ball screw mechanism. The ball screw mechanism is formed of a screw portion 4, a plurality of balls 5, a nut portion 6, and a sleeve 7. Moreover, the balls 5 are filled together with grease between a groove 4a of the screw portion 4 and a groove 6a of the nut portion 6. The shaft 2A of the electric motor 1 is fastened to the screw portion 4 by publicly-known fastening means. The rotational motion of the electric motor 1 is transmitted to the screw portion 4 directly or through a speed changer mechanism. This rotational motion is transmitted to the sleeve 7 through the plurality of balls 5, and is converted to the linear motion for driving the sleeve 7 in an up-and-down direction.

The sleeve 7 has a cylindrical shape, and includes an engagement portion 7a at one end portion in a lengthwise direction of the cylindrical shape and a flange portion 7b at another end portion. The engagement portion 7a is configured to engage with an engaged member 9 of the movable plate 8 described later. The flange portion 7b is configured to receive the second biasing member 12, which is described later, engaged therewith. The nut portion 6 is fitted into the cylindrical shape. The nut portion 6 has the groove 6a with which the balls 5 engage. The engagement portion 7a of the sleeve 7 engages with the engaged member 9 of the movable plate 8, and rotation stop portions 8b of the movable plate 8 described later engage with a housing 10 of the electrically driven actuator 100 for opening and closing a valve, thereby allowing the sleeve 7 to be driven in the up-and-down direction without rotation. Further, a sectional shape of the sleeve 7 is not limited to a circle, and may be any shape such as a polygon.

The movable plate 8 is arranged on a side opposed to the electric motor 1. A connection portion 8a to which a valve body is connected is formed substantially at a center of the movable plate 8. The movable plate 8 has a substantially disk shape, and includes at least one rotation stop portion 8b on a peripheral edge portion of the substantially disk shape. The rotation stop portions 8b have a relationship of a cam follower with respect to the housing 10 of the electrically driven actuator 100 for opening and closing a valve. That is, the rotation stop portions 8b are configured to allow a movement of the movable plate 8 in the up-and-down direction and restrict a movement of the movable plate 8 in a rotation direction. Moreover, a movement range 8L of the movable plate 8 is defined as a range in which the rotation stop portions 8b can move up and down with respect to the housing 10. That is, the movement range 8L corresponds to a movable range of the valve body. The shape of the movable plate 8 is not limited to the substantially disk shape, and may be in a board form having any suitable shape. In that case, a bearing mechanism serving as a member configured to allow the movement in the up-and-down direction, a rotation stop mechanism configured to restrict the movement in the rotation direction, and the like can be used.

The movable plate 8 further includes the engaged member 9. The engaged member 9 is provided on a side opposite to the side on which the valve body is connected. The engaged member 9 is configured to engage with the engagement member 7a of the sleeve 7. A claw portion 9a with which the engagement portion 7a engages is formed on the electric motor 1 side of the engaged member 9. A stopper portion 9b configured to define a movement range 7L of the engagement portion 7a in the up-and-down direction is formed on the opposite side. Further, a slide portion 9d is formed between the claw portion 9a and the stopper portion 9b. The engagement portion 7a of the sleeve 7 is brought into slide contact with the slide portions 9d. Moreover, the slide portions 9d are configured to allow the movement of the sleeve 7 in the up-and-down direction and restrict the movement of the sleeve 7 in the rotation direction. Each of the slide portions 9d may have a groove shape. Moreover, the engaged member 9 has an abutment portion 9c. The abutment portion 9c extends from the movable plate 8 toward a direction of the electric motor 1. The second biasing member 12 is in abutment against a top portion of the abutment portion 9c.

The housing 10 of the electrically driven actuator 100 for opening and closing a valve is formed of an electric-motor side fixed plate 10A, a valve-body side fixed plate 10B, and a main body portion 10C. The electric-motor side fixed plate 10A and the valve-body side fixed plate 10B are fixed to both end portions of the main body portion 10C having a substantially tubular shape, respectively. Components of the electrically driven actuator 100 for opening and closing a valve are accommodated in an internal space of the main body portion 10C. The shape of the main body portion 10C is the tubular shape in the first embodiment. However, the shape of the main body portion 10C is not limited to the cylindrical shape, and may be any shape with a suitable sectional shape, which is applied to all of the components having the same function. The first biasing member 11 is arranged between the electric-motor side fixed plate 10A and the movable plate 8 so that the movable plate 8 is biased by the first biasing member 11 toward a first direction, which is a direction toward which the valve body closes. Moreover, the second biasing member 12 is arranged between the flange portion 7b of the sleeve 7 of the conversion mechanism 3 and the abutment portion 9c of the engaged portion 9. The sleeve 7 is biased by the second biasing member 12 toward a second direction, which is a direction toward which the valve body opens. The second biasing member 12 is arranged in a state in which the second biasing member 12 is compressed in advance by a set load F02 so that the sleeve 7 is always in abutment against the second biasing member 12.

Figure 3:
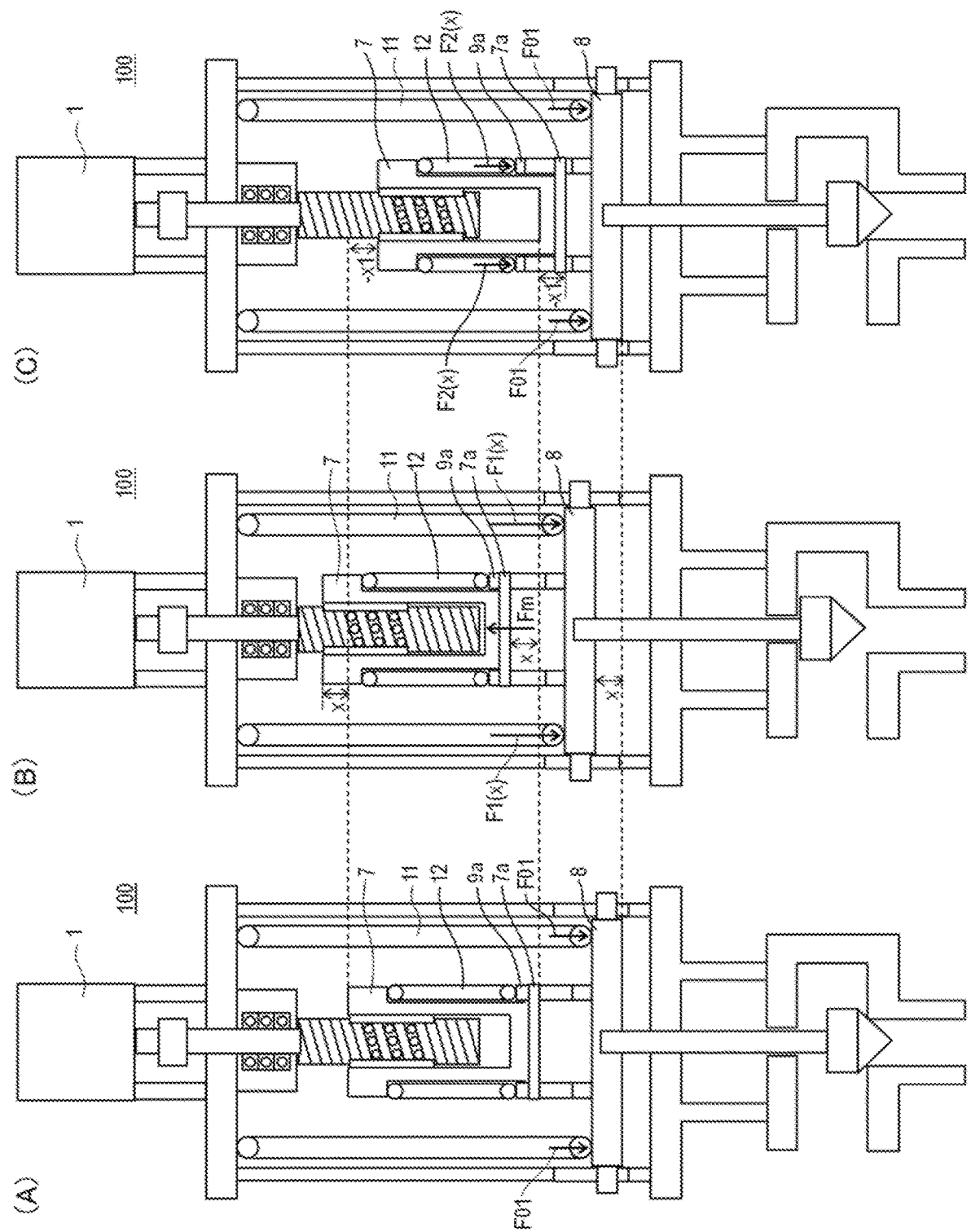
FIG. 3(A) to FIG. 3(C) are schematic views for illustrating an operation of the electrically driven actuator 100 for opening and closing a valve according to the first embodiment of the present invention.

With reference to FIG. 3(A) to FIG. 3(C), which are views for illustrating an operation of the electrically driven actuator 100 for opening and closing a valve according to the first embodiment, description is now given of opening and closing operations of the valve body. FIG. 3(A) is a view for illustrating a normal closed state in which the valve body is closed. FIG. 3(B) is a view for illustrating an open state of the valve body. The valve body is biased by a set force F01 of the first biasing member 11 toward the first direction so as to be closed. In order to open the valve body from this state, first, the electric motor 1 is driven, and the rotational driving force of the electric motor 1 is converted to the linear driving force Fm by the conversion mechanism 3. The linear driving force Fm causes the sleeve 7, which is the component of the conversion mechanism 3, is linearly moved upward by a displacement "x". The movement of the sleeve 7 toward the electric motor 1 side causes the engagement portion 7a, which engages with the claw portion 9a of the engaged member 9, to pull the engaged member 9 toward the electric motor 1 side. When the engaged member 9 is pulled up, the movable plate 8 is moved by the displacement "x" toward the second direction, and the valve body connected to the movable plate 8 thus opens. The valve body can be moved to a desired position and fixed thereat by a servo mechanism of the electric motor 1.

Meanwhile, in order to close the valve body by a normal method, the sleeve 7 is driven toward the first direction through control of the electric motor 1. The movable plate 8 is moved toward the first direction by a biasing force F1(x) of the first biasing member 11, and the valve body is moved toward the first direction, thereby closing the valve body. When the valve body is closed in the manner described above, it is so-called a passive closing drive which relies only on the biasing force F1(x) of the first biasing member 11 is executed. Moreover, according to the present invention, in order to meet the need for quickly closing the valve body, the closing operation of the valve body can be accelerated through transmitting the linear driving force Fm of the electric motor 1 converted by the conversion mechanism 3 to the movable plate 8 through the second biasing member 12. That is, when the valve body is to be closed in the manner described above, the linear driving force Fm of the electric motor 1 can be applied to the movable plate 8 in addition to the biasing force F1(x) of the first biasing member 11, and so-called active closing drive is thus achieved.

Description is now given of an operation of emergency shutdown of quickly closing the valve body when the supply of power to the electric motor 1 is lost, when the supply of power is failed, or when an automatic or manual trigger is activated by abnormality detection. As described above, in the normal closing operation, the valve body is closed through the control of the electric motor 1. Meanwhile, in a case of emergency, for example, when the electric motor 1 loses the supply of power, the valve body is required to be closed as soon as possible. According to the present invention, when the electric motor 1 has lost the supply of power, and the servo mechanism thereof thus stops, the movable plate 8 is quickly moved toward the first direction by the first biasing member 11, the valve body can thus quickly be closed, and a highly reliable failsafe function is achieved. However, in the above-mentioned quick closing operation of the valve body, a considerably high impact load caused by rotational inertia including the electric motor 1 occurs, and there is a fear in that components including the electric motor 1, the conversion mechanism 3, and the valve body may be damaged, or fatigue at an undesirable level may be accumulated.

In the electrically driven actuator 100 for opening and closing a valve according to the first embodiment of the present invention, when the valve body quickly moves toward the first direction and is seated in case of emergency, the conversion mechanism 3 can be displaced relative to the movable plate 8 in the up-and-down direction along an axis substantially at a center portion of the movable plate 8. FIG. 3(C) is a view for illustrating a state in which the conversion mechanism 3 is relatively displaced when the valve body is quickly closed. The valve body is closed both in FIG. 3(A) and FIG. 3(C). However, as illustrated in FIG. 3(C), the sleeve 7 is displaced by a displacement −x1 toward the direction away from the electric motor 1. Description is now given of a mechanism of generating the relative displacement of the sleeve 7. First, for example, when the electric motor 1 loses the supply of power as described above, and the movable plate 8 quickly moves toward the first direction, the sleeve 7 engaging with the claw portion 9a is accordingly displaced. As illustrated in FIG. 1, the displacement of the sleeve 7 is converted to a rotational force for rotating the screw portion 4 through the plurality of balls 5. As the screw portion 4 rotates, the shaft 2A rotates. The electric motor 1 is rotated by the rotation of the shaft 2A, and rotation accompanying large rotational inertia is generated. In turn, this rotational inertia displaces the sleeve 7 relative to the movable plate 8 after the valve body is seated. That is, the relative displacement −x1 of the sleeve 7 is generated by the conversion of the large rotational inertia (rotational motion) to the linear motion. This relative displacement −x1 of the sleeve 7 compresses the second biasing member 12 toward the first direction. A biasing force F2(x1) is generated in the second biasing member 12. The generated biasing force F2(x1) acts on the movable plate 8 through the engaged member 9 as a force corresponding to an equivalent mass obtained by converting the large rotational inertia to a translational mass. However, the mechanism of the relative displacement of the sleeve 7 mitigates the considerably high impact load caused by the rotational inertia, thereby being capable of preventing the damage of the components including the electric motor 1, the conversion mechanism 3, and the valve body or the fatigue accumulation at an undesirable level. Moreover, in the active closing drive of applying the linear driving force Fm of the electric motor 1 to the movable plate 8, when the control of the electric motor 1 overshoots, the damage of the components or the fatigue accumulation at an undesirable level can be prevented by the relative displacement of the sleeve 7.

Figure 4:
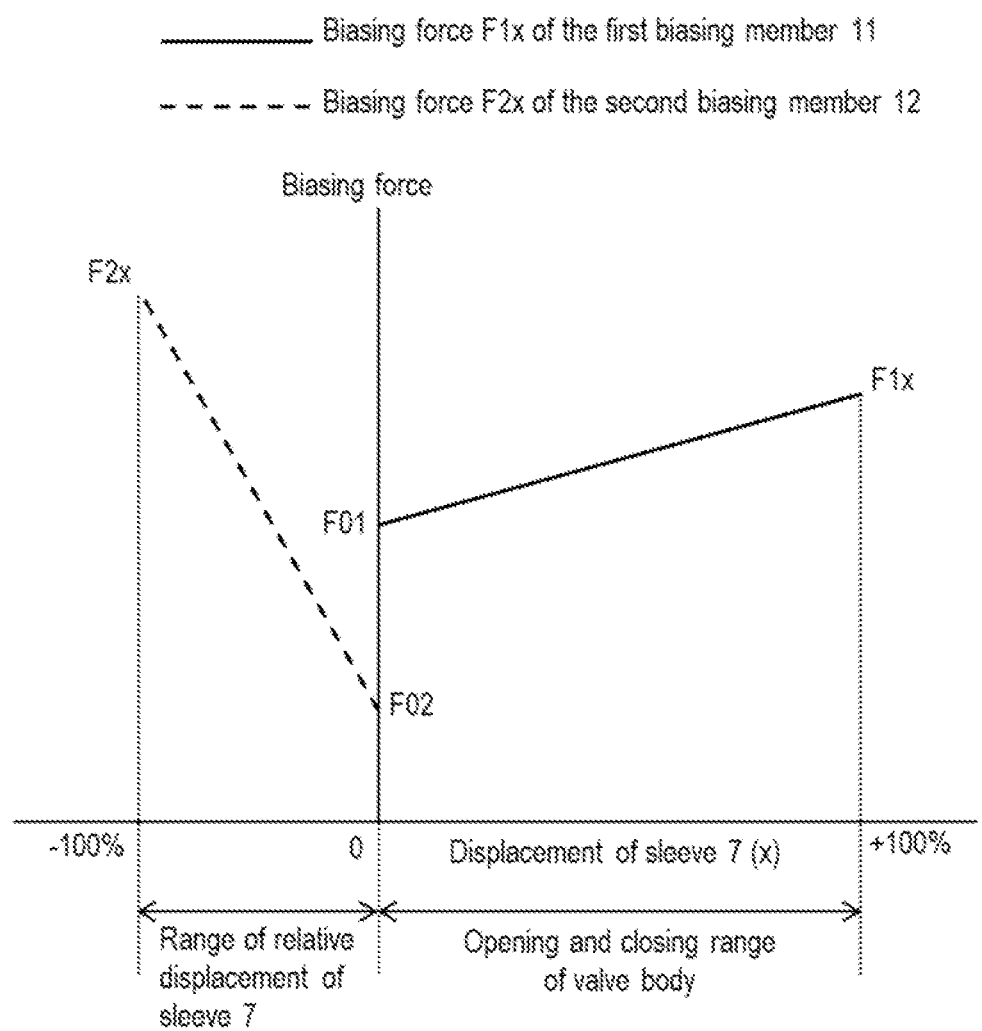
FIG. 4 is a graph for showing characteristics of biasing members of the electrically driven actuator 100 for opening and closing a valve according to the first embodiment of the present invention.

With reference to FIG. 4, which is a graph for showing characteristics of the first biasing member 11 and the second biasing member 12, description is now given of the forces acting on the movable plate 8. In FIG. 4, a relationship between the displacement of the sleeve 7 and the biasing forces is shown. The horizontal axis represents the displacement "x" of the sleeve 7. The vertical axis represents the biasing forces of the first biasing member 11 and the second biasing member 12.

First, the forces acting on the movable plate 8 in the normal opening operation of the valve body are described. In FIG. 4, in the state in which the valve body is closed, that is, the displacement "x" of the sleeve 7 is 0, the set force F01 acts on the movable plate 8 (valve body) by the first biasing member 11. Then, the force acting on the movable plate 8 changes as described below until the sleeve 7 is displaced, the engaged member 9 are pulled up, and the displacement "x" of the sleeve 7 changes from 0% to 100%, that is, the opening degree of the valve body becomes 100%. The forces acting on the movable plate 8 until the opening degree of the valve body becomes 100% are as follows. Until the opening degree of the valve body becomes 100%, the biasing force $F1(x)$ of the first biasing member 11 corresponding to the displacement "x" of the sleeve 7 and the linear driving force Fm applied by the electric motor 1 in the direction opposite to that of the biasing force $F1(x)$ act on the movable plate 8. Then, the movable plate 8 is stopped at a desired position through the control of the electric motor 1. The valve body is apart from a valve seat, and the biasing forces do not act on the valve body.

Then, the forces applied to the movable plate 8 in the normal closing operation of the valve body are described. In order to close the valve body from the state in which the displacement of the sleeve 7 is at any position from 0% to 100%, that is, the state in which the valve body is opened at a certain opening degree, the electric motor 1 is driven, to thereby move the sleeve 7 downward. As the sleeve 7 is displaced by the displacement "x", the biasing force $F1(x)$ applied by the first biasing member 11 decreases, and the forces acting on the movable plate 8 accordingly decrease. In the active closing drive of accelerating the operation of the valve body toward the closing direction, the operation of the valve body toward the closing direction can be accelerated by increasing the rotational driving force of the electric motor 1. Moreover, this rotational driving force is converted to the linear driving force Fm by the conversion mechanism 3, and the increased linear driving force Fm is transmitted to the movable plate 8 through the sleeve 7 and the second biasing member 12.

Description is now given of the forces acting on the movable plate 8 in the emergency closing operation of the valve body. When the valve body is quickly closed from the state in which the displacement of the sleeve 7 is at any position from 0% to 100, that is, the valve body is opened at a certain opening degree, the movable plate 8 on which the biasing force $F1(x)$ applied by the first biasing member 11 acts is quickly moved toward the first direction, to thereby quickly close the valve body. However, the sleeve 7 is also displaced downward (first direction) as a result of the movement of the movable plate 8. The displacement of the sleeve 7 is converted to the rotational force for rotating the screw portion 4 through the plurality of balls 5. As the screw portion 4 rotates, the shaft 2A of the electric motor 1 is rotated. As illustrated in FIG. 3(C), even in the state in which the valve body is closed, the sleeve 7 is displaced relative to the movable plate 8 by the displacement −x (displaced toward the first direction) beyond the position of the displacement 0 by the rotational inertia including the electric motor 1. The second biasing member 12 is compressed by the displacement −x of the sleeve 7, and the biasing force $F2(x)$ applied by the second biasing member 12 acts on the movable plate 8 (valve body) in addition to the set force F01 applied by the first biasing member 11.

In the electrically driven actuator 100 for opening and closing a valve according to the first embodiment of the present invention, as described above, the sleeve 7 can be displaced relative to the movable plate 8 beyond the position of the displacement 0 in the state in which the valve body is closed. The impact load caused by the rotational inertia including the electric motor 1 is mitigated through the sleeve 7 being relatively displaced, thereby compressing the second biasing member 12, and the effect of preventing the damage of the components including the electric motor 1, the conversion mechanism 3, and the valve body caused by the quick closing of the valve body can be obtained. When the mitigation mechanism for the impact load caused by the relative displacement of the sleeve 7 and the second biasing member 12 is not provided, the considerably high impact load acts on the valve body, and there is a fear in that the components may be damaged, or fatigue at an undesirable level may be accumulated. However, according to the first embodiment of the present invention, the electrically driven actuator 100 for opening and closing a valve which secures the failsafe function having high durability and reliability can be provided.

In the first embodiment, for example, a coil spring is used as the first biasing member 11, and a disk spring is used as the second biasing member 12. However, the present invention is not limited to these springs, and any spring elements including a ring spring and a volute spring capable of accumulating elastic energy can be used. The same effects can be obtained through use of these spring elements.

Moreover, as shown in FIG. 4, the spring stiffness of the second biasing member 12 is higher than the spring stiffness of the first biasing member 11. This high spring stiffness is set so that a high set load at which the second biasing member 12 hardly contract in the normal opening and closing operations of the valve body is applied, and, at the same time, the compression amount caused by the impact load during the failsafe is suppressed. Deflections and rebounds of the second biasing member 12 are prevented through setting this high spring stiffness.

Second Embodiment

Figure 5:
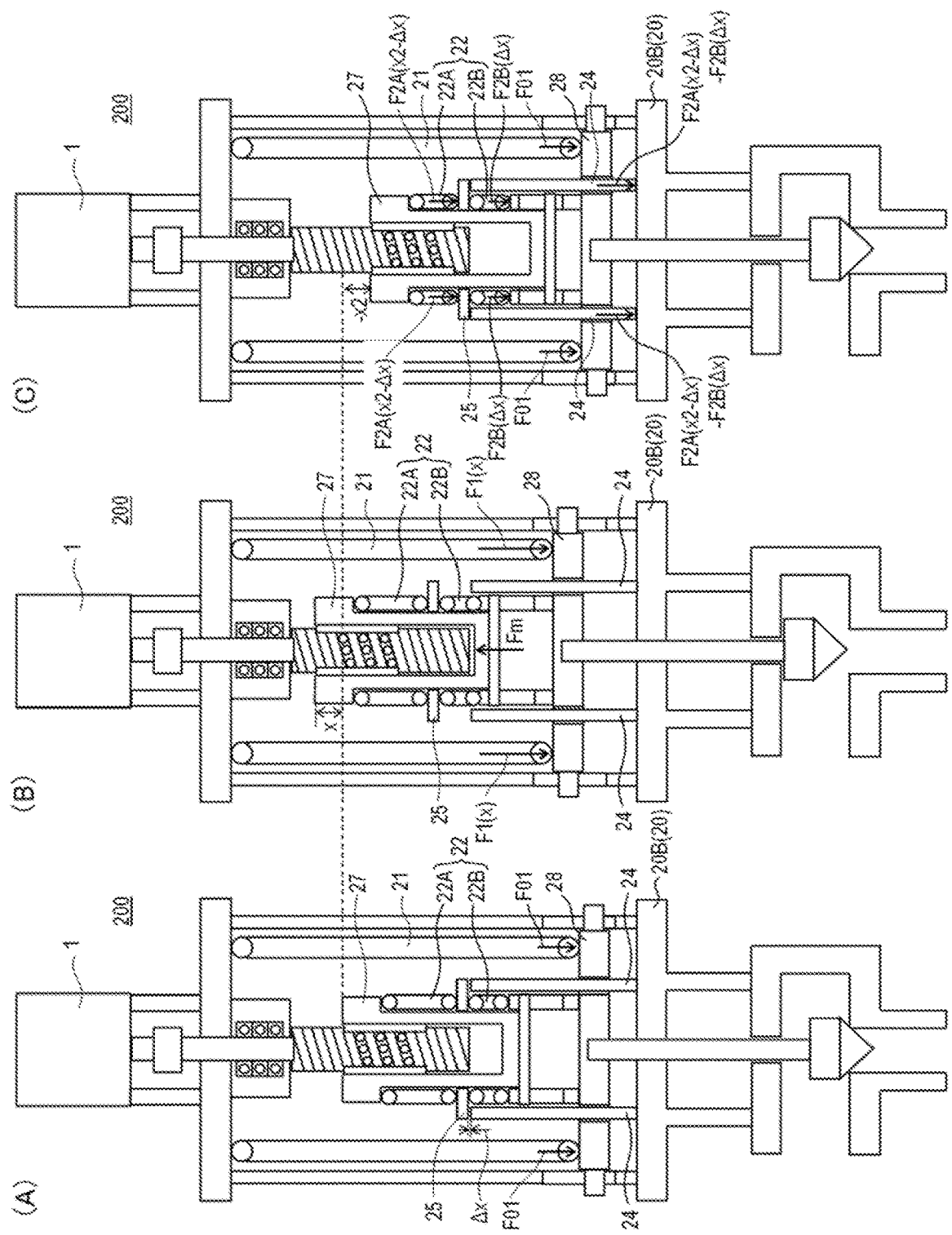
FIG. 5(A) to FIG. 5(C) are schematic views for illustrating an operation of an electrically driven actuator 200 for opening and closing a valve according to a second embodiment of the present invention.

With reference to FIG. 5(A) to FIG. 5(C), description is now given of an electrically driven actuator 200 for opening and closing a valve according to a second embodiment of the present invention. In the drawings, the same components as those in the first embodiment are described by denoting the same reference symbols, and a detailed description thereof is omitted.

FIG. 5(A) is a view for illustrating the normal closed state in which the valve body is closed. FIG. 5(B) is a view for illustrating the open state of the valve body. The electrically driven actuator 200 for opening and closing a valve according to the second embodiment further includes support members 24 and a lock member 25 in addition to the configuration in the first embodiment. The support members 24 are fixed to a valve-body side fixed plate 20B. The lock member 25 is arranged at a predetermined position of a second biasing member 22. At least one support member 24 is provided, and two support members 24 are provided in the second embodiment. The support members 24 each pass through a movable plate 28, and are fixed to the valve-body side fixed plate 20B. In this configuration, the second biasing member 22 is separated into two portions by the lock member 25. A biasing force applied by a portion of the second biasing member 22 on the electric motor 1 side with respect to the lock member 25 is represented by F2A. A biasing force applied by a portion of the second biasing member 22 on the valve body side with respect to the lock member 25 is represented by F2B. Moreover, in the state of FIG. 5(A) in which the valve body is closed, the support members 24 and the lock member 25 are arranged across a slight gap $\Delta x$. Moreover, as illustrated FIG. 5(B), in a state in which the valve body is opened, the support members 24 and the lock member 25 are completely spaced apart from each other. Thus, the operations from closed state, to opening, and to normal closing of the valve body are the same as those in the first embodiment.

Description is now given of an operation of emergency shutdown of quickly closing the valve body when the supply of power to the electric motor 1 is lost, when the supply of power is failed, or when an automatic or manual trigger is activated by abnormality detection. Similarly to the first embodiment, in the normal closing operation, the valve body is closed through the control of the electric motor 1. Meanwhile, in a case of emergency, for example, when the electric motor 1 loses the supply of power, the valve body is required to be closed as soon as possible. Similarly to the first embodiment, in the second embodiment, the movable plate 28 is quickly moved toward the first direction by the first biasing member 21, the valve body can thus quickly be closed, and a highly reliable failsafe function is achieved. Moreover, the valve body is closed both in FIG. 5(A) and FIG. 5(C), but, as illustrated in FIG. 5(C), the sleeve 27 is displaced by a displacement −x2 toward the direction away from the electric motor 1. This mechanism configured to generate the relative displacement of the sleeve 27 is the same as that in the first embodiment, and description thereof is therefore omitted.

In the electrically driven actuator 200 for opening and closing a valve according to the second embodiment of the present invention, when the valve body quickly moves toward the first direction and is seated, for example, in case of emergency, a conversion mechanism 23 (sleeve 27) can be displaced relative to the movable plate 28 as in the first embodiment. In the second embodiment, the support members 24 and the lock member 25 arranged apart from each other across the slight gap $\Delta x$ are provided. First, an action when the sleeve 27 is relatively displaced by the displacement corresponding to the slight gap $\Delta x$, and the lock member 25 is brought into abutment against the support members 24 is described. The relative displacement of the sleeve 27 until the abutment compresses the second biasing member 22 toward the first direction, and a biasing force F2B($\Delta x$) is generated in the portion of the second biasing member 22 on the valve body side as illustrated in FIG. 5(C). The generated biasing force F2B($\Delta x$) acts on the movable plate 28 as a force corresponding to a part of an equivalent mass obtained by converting large rotational inertia to a translational mass. This mechanism of the relative displacement of the sleeve 27 and the configurations of the support members 24 and the lock member 25 mitigate a part of a considerably high impact load caused by the rotational inertia, and the mitigated impact load acts on the valve body. Description is now given of the mitigation of the impact load through the relative displacement of the sleeve 27 after the lock member 25 is brought into abutment against the support members 24. FIG. 5(C) is a view for illustrating the state in which the conversion mechanism 23 is relatively displaced, and the lock member 25 is brought into abutment against the support members 24 when the valve body is quickly closed. Even when the lock member 25 is brought into abutment against the support members 24, the sleeve 27 is displaced by the displacement −x2 toward the direction away from the electric motor 1, and the portion of the second biasing member 22 on the electric motor 1 side with respect to the lock member 25 is compressed toward the first direction. Moreover, the biasing force F2A(x2−$\Delta x$) is generated in the portion of the second biasing member 22 on the electric motor 1 side with respect to the lock member 25. The generated biasing force F2A(x2−$\Delta x$) acts on the support members 24 through the lock member 25 as a force corresponding to a remaining part of the equivalent mass obtained by converting the large rotational inertia to the translational mass, and is released to a housing 20 through the support members 24. The second embodiment is configured so that the impact load is released not only to the second biasing member 22 but also to the valve-body side fixed plate 20B forming the housing 20 through the support members 24, and the load on the valve body is thus mitigated. That is, a part of the impact load is mitigated, and the mitigated impact load acts on the valve body as a force substantially equal to the biasing force F2B($\Delta x$) until the lock member 25 abuts against the support members 24. Moreover, after the lock member 25 abuts against the support members 24, remaining portions F2A(x2−$\Delta x$)−F2B($\Delta x$) of the impact load are released to the valve-body side fixed plate 20B through the support members 24. The mechanism of the relative displacement of the sleeve 27, and the support members 24 and the lock member 25 mitigate the considerably high impact load caused by the rotational inertia, and a damage of the components including the electric motor 1, the conversion mechanism 23, and the valve body or fatigue accumulation at an undesirable level can thus be prevented.

Description has been given of the mode in which the lock member 25 is arranged at the predetermined position of the second biasing member 22. However, the second biasing member 22 may include an upper biasing member and a lower biasing member independent of each other on both sides of the lock member 25. The biasing member of the second biasing member 22 on the valve body side with respect to the lock member 25 is referred to as a lower-side biasing member 22B, and the biasing member on the electric motor 1 side with respect to the lock member 25 is referred to as an upper-side biasing member 22A. The lower-side biasing member 22B is indispensable for securing the abutment of the support members 24 against the lock member 25, to thereby release the impact load caused by the rotational inertia including the electric motor 1 when the impact load acts while allowing a more or less mounting error (approximately a few millimeters). When the lower-side biasing member 22B is not provided, an adjustment of the stroke in a very minute unit (approximately a few hundredths of a millimeter to a few tenths of a millimeter) is required for the mounting, which is not practical. This is because, when the positions of the support members 24 are even slightly too low, the lock member 25 and the support members 24 are not brought into abutment against each other, and the part of the impact load cannot thus be released. Meanwhile, when the positions of the support members 24 are even slightly too high, the valve body is not seated at the closed position of the valve body, and the closing function of the valve body is not achieved.

Points to be considered are listed below in order to use the lock member 25 to set the lower biasing member 22B and the upper biasing member 22A of the second biasing member 22. First, such a point that the spring stiffness of the lower biasing members 22B is only required to be set to spring stiffness that can exhibit a deflection in a unit of a few millimeters in order to ease the adjustment of the mounting position of the support members 24 can be mentioned. Moreover, the upper-side biasing members 22A are the portions configured to exhibit the shock absorbing effect for the impact load caused by the rotational inertia including the electric motor 1. Therefore, such a point that the spring stiffness of the upper-side biasing members 22A is set to satisfy requirements of how much the impact load is mitigated and how much the relative displacement is allowed can be mentioned. The impact load mitigated by the upper biasing members 22A is released to the housing 20 through the support members 24 after the support members 24 are brought into abutment against the lock member 25.

When disk springs having the same shape are serially piled as the lower-side biasing member 22B and the upper-side biasing member 22A of the second biasing member 22, the position of the lock member 25 is on a lower side with respect to a substantial half of an overall length of the second biasing member 22 as illustrated in FIG. 5(A). Moreover, the support members 24 are at least one stopper member provided so as to pass through the movable plate 28. Further, the lock member 25 is a washer member configured to be locked to the support members 24, but the present invention is not limited to this configuration, and a mechanism capable of achieving the supporting and the locking can provide the same effect. Moreover, the support members 24 are not required to be fixed to the valve-body side fixed plate 20B, but may be fixed to other fixed member.

In the electrically driven actuator 200 for opening and closing a valve according to the second embodiment of the present invention, the impact load is mitigated by the second biasing member 22, and the support members 24 release the mitigated impact load to the housing 20, thereby being capable of preventing the damage of the valve body and the fatigue accumulation at an undesirable level. Moreover, when durability of an upper structure of the electrically driven actuator 200 for opening and closing a valve is higher than that of the valve body, the stiffness of the upper-side biasing member 22A on the upper side with respect to the lock member 25 is intentionally increased (cushion performance is reduced), thereby being capable of reducing the relative displacement of the sleeve 27. However, when the stiffness of the upper-side biasing member 22A is too high, the original cushion effect is lost, and balance is thus required.

In the electrically driven actuator 200 for opening and closing a valve according to the second embodiment of the present invention, as described above, the sleeve 27 can be displaced relative to the movable plate 28 beyond the position of the displacement 0 in the state in which the valve body is closed. The impact load caused by the rotational inertia including the electric motor 1 is mitigated by the second biasing member 22 through the sleeve 27 being relatively displaced, thereby compressing the second biasing member 22. Further, the mitigated impact load is released to the housing 20 by the support members 24, and the effect of preventing the damage of the components including the electric motor 1, the conversion mechanism 23, and the valve body or the fatigue accumulation at an undesirable level is obtained. Therefore, according to the second embodiment of the present invention, the electrically driven actuator 200 for opening and closing a valve which secures the failsafe function having high durability and reliability can be provided.

Third Embodiment

Figure 6:
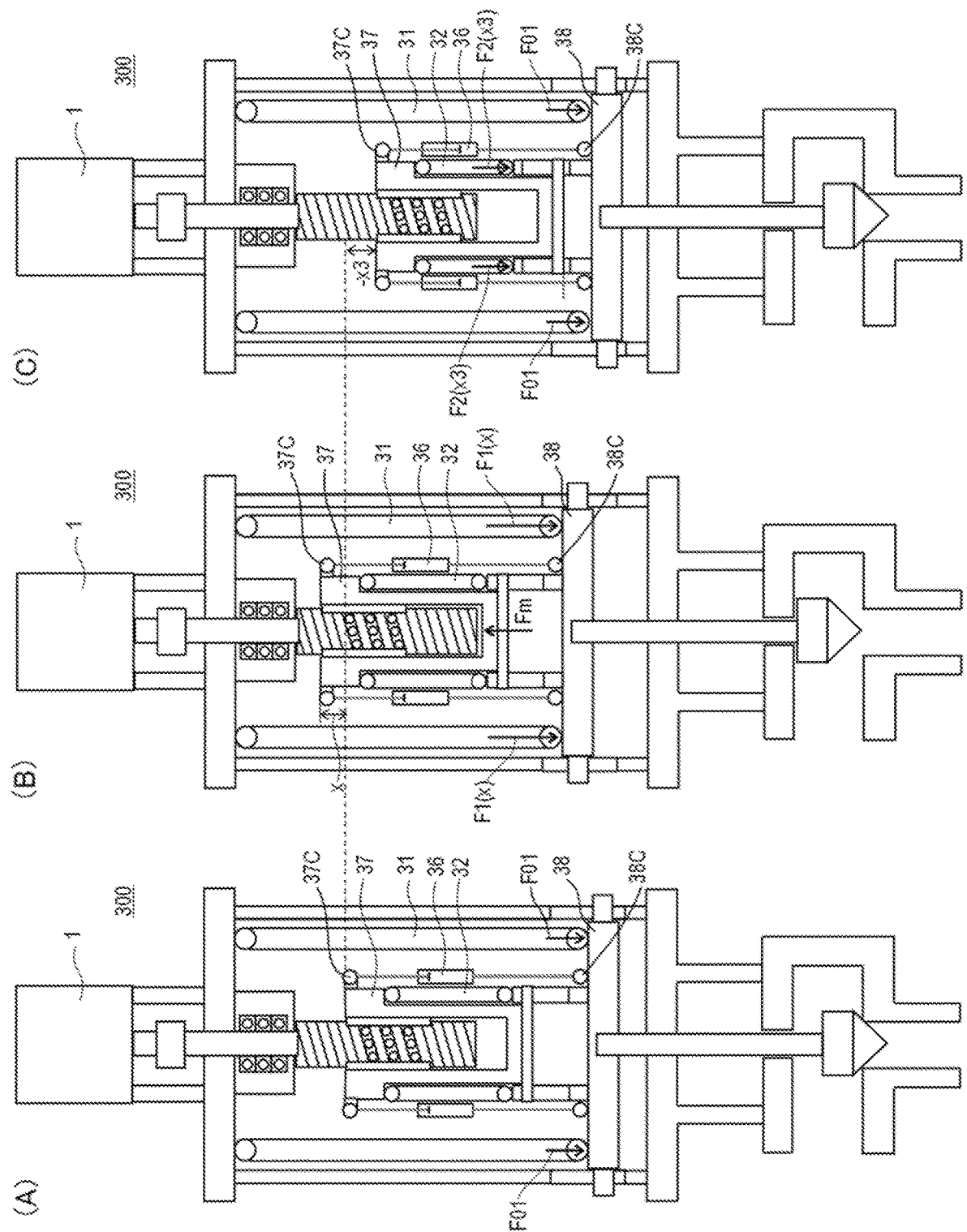
FIG. 6(A) to FIG. 6(C) are schematic views for illustrating an operation of an electrically driven actuator 300 for opening and closing a valve according to a third embodiment of the present invention.

With reference to FIG. 6(A) to FIG. 6(C), description is now given of an electrically driven actuator 300 for opening and closing a valve according to a third embodiment of the present invention. In the drawings, the same components as those in the first embodiment are described by denoting the same reference symbols, and a detailed description thereof is omitted.

FIG. 6(A) is a view for illustrating the normal closed state in which the valve body is closed. FIG. 6(B) is a view for illustrating the open state of the valve body. The electrically driven actuator 300 for opening and closing a valve according to the third embodiment further includes damper elements 36 in addition to the configuration of the first embodiment. One side of each of the damper elements 36 is fixed to an end portion 37c of a sleeve 37 on the electric motor 1 side. Another side of each of the damper elements 36 is fixed to a fixed portion 38c of a movable plate 38. The damper elements 36 are provided between the sleeve 37 and the movable plate 38. Therefore, a damping function of the damper elements 36 does not act in a state of FIG. 6(A) in which the valve body is closed and in a state of FIG. 6(B) in which the valve body is opened. Thus, the operations from closed state, to opening, and to normal closing of the valve body are the same as those in the first embodiment.

Description is now given of an operation of emergency shutdown of quickly closing the valve body when the supply of power to the electric motor 1 is lost, when the supply of power is failed, or when an automatic or manual trigger is activated by abnormality detection. Similarly to the first embodiment, in the normal operation, the valve body is closed through the control of the electric motor 1. Meanwhile, in a case of emergency, for example, when the electric motor 1 loses the supply of power, the valve body is required to be closed as soon as possible. Similarly to the first embodiment, in the second embodiment, the movable plate 38 is quickly moved toward the first direction by first biasing member 31, the valve body can thus quickly be closed, and a highly reliable failsafe function is achieved. Moreover, the valve body is closed both in FIG. 6(A) and FIG. 6(C), but, as illustrated in FIG. 6(C), the sleeve 37 is displaced by a displacement −x3 toward the direction away from the electric motor 1. This mechanism configured to generate the relative displacement of the sleeve 37 is the same as that in the first embodiment, and description thereof is therefore omitted.

In the electrically driven actuator 300 for opening and closing a valve according to the third embodiment of the present invention, when the valve body quickly moves toward the first direction and is seated, for example, in case of emergency, a conversion mechanism 33 (sleeve 37) can be displaced relative to the movable plate 38 as in the first embodiment. However, in some cases, a second biasing member 32 may repeat rebounds due to their own elasticity when the conversion mechanism 33 is relatively displaced. FIG. 6(C) is a view for illustrating the state in which the conversion mechanism 33 is relatively displaced, and the damper elements 36 exert damping forces when the valve body is quickly closed. As in the first embodiment, this relative displacement −x3 of the sleeve 37 compresses the second biasing member 32 toward the first direction. A biasing force $F2(x3)$ is generated in the second biasing member 32. The generated biasing force F2($x3$) acts on the movable plate 38 as a force corresponding to an equivalent mass obtained by converting large rotational inertia to a translational mass. However, the mechanism of the relative displacement of the sleeve 37 can mitigate a considerably high impact load caused by the rotational inertia, thereby being capable of preventing a damage of the components including the electric motor 1, the conversion mechanism 33, and the valve body or fatigue accumulation at an undesirable level. Further, the damping forces of the damper elements 36 can suppress the rebounds of the second biasing member 32, and the normal closed state can quickly be achieved.

In the third embodiment, as the damper elements 36, for example, oil dampers are used, but the present invention is not limited to the oil dampers, and the same effect can be obtained as long as the damping effect is obtained.

The electrically driven actuator 300 for opening and closing a valve according to the third embodiment of the present invention can provide, in addition to the effects of the first embodiment, the excellent effect of suppressing the rebounds of the second biasing member 32 through use of the damping forces of the damper elements 36, thereby being capable of quickly achieving the normal closed state. Thus, according to the third embodiment of the present invention, the electrically driven actuator 300 for opening and closing a valve which secures the failsafe function having the high durability and reliability can be provided. A ring spring formed through alternately piling inner rings and outer rings having conical surfaces may be used as the second biasing member 32. When the ring spring is used, the ring spring itself serves also as a damper element configured to suppress a rebound of the ring spring, and provides the same effect. Moreover, only the ring springs may be provided without providing the damper elements 36, or both of the ring springs and the damper elements 36 may be provided.

Fourth Embodiment

With reference to FIG. 7(A) to FIG. 7(C), description is now given of an electrically driven actuator 400 for opening and closing a valve according to a fourth embodiment of the present invention. In the drawings, the same components as those in the first embodiment are described by denoting the same reference symbols, and a detailed description thereof is omitted.

FIG. 7(A) is a view for illustrating the normal closed state in which the valve body is closed. FIG. 7(B) is a view for illustrating the open state of the valve body. The electrically driven actuator 400 for opening and closing a valve according to the fourth embodiment includes support members 44 and a lock member 45, which are the components of the second embodiment, and further includes damper elements 46, which are the components of the third embodiment, in addition to the configuration of the first embodiment. The configurations of the support members 44 and the lock member 45 are the same as those described in the second embodiment, and description thereof is therefore omitted. Moreover, the configurations of the damper elements 46 are the same as those described in the third embodiment, and description thereof is therefore omitted. In this configuration, a second biasing member 42 is separated into the two portions by the lock member 45. The biasing force applied by a portion of the second biasing member 42 on the electric motor 1 side with respect to the lock member 45 is represented by F2A. The biasing force applied by a portion of the second biasing member 42 on the valve body side with respect to the lock member 45 is represented by F2B. Moreover, in the state of FIG. 7(A) in which the valve body is closed, the support members 44 and the lock member 45 are arranged across the slight gap $\Delta x$. Moreover, in the state of FIG. 7(B) in which the valve body is opened, the support members 44 and the lock member 45 are completely spaced apart from each other. Further, in the states of FIG. 7(A) and FIG. 7(B), the damper elements 46 do not function. Thus, the operations from closed state, to opening, and to normal closing of the valve body are the same as those in the first embodiment.

Description is now given of an operation of emergency shutdown of quickly closing the valve body when the supply of power to the electric motor 1 is lost, when the supply of power is failed, or when an automatic or manual trigger is activated by abnormality detection. Similarly to the first embodiment, in the normal closing operation, the valve body is closed through the control of the electric motor 1. Meanwhile, in a case of emergency, for example, when the electric motor 1 loses the supply of power, the valve body is required to be closed as soon as possible. Similarly to the first embodiment, in the fourth embodiment, a movable plate 48 is quickly moved toward the first direction by a first biasing member 41, the valve body can thus quickly be closed, and a highly reliable failsafe function is achieved. Moreover, the valve body is closed both in FIG. 7(A) and FIG. 7(C), but, as illustrated in FIG. 7(C), a sleeve 47 is displaced by a displacement $-x4$ toward the direction away from the electric motor 1. This mechanism configured to generate the relative displacement of the sleeve 47 is the same as that in the first embodiment, and description thereof is therefore omitted.

In the electrically driven actuator 400 for opening and closing a valve according to the fourth embodiment of the present invention, when the valve body quickly moves toward the first direction and is seated, for example, in case of emergency, a conversion mechanism 43 (sleeve 47) can be displaced relative to the movable plate 48 as in the first embodiment. In the fourth embodiment, the support members 44 and the lock member 45 arranged apart from each other across the slight gap $\Delta x$ are provided. First, an action when the sleeve 47 is relatively displaced by the displacement corresponding to the slight gap $\Delta x$, and the lock member 45 is brought into abutment against the support members 44 is described. The relative displacement of the sleeve 47 until the abutment compresses the second biasing member 42 toward the first direction, and a biasing force F2B($\Delta x$) is generated in the portion of the second biasing member 42 on the valve body side as illustrated in FIG. 7(C). The generated biasing force F2B($\Delta x$) acts on the movable plate 48 as a force corresponding to a part of an equivalent mass obtained by converting large rotational inertia to a translational mass. This mechanism of the relative displacement of the sleeve 47 and the configurations of the support members 44 and the lock member 45 mitigate a part of a considerably high impact load caused by the rotational inertia, and the mitigated impact load acts of the valve body. Description is now given of the mitigation of the impact load through the relative displacement of the sleeve 47 after the lock member 45 is brought into abutment against the support members 44. FIG. 7(C) is a view for illustrating a state in which the conversion mechanism 43 is relatively displaced, the lock member 45 is brought into abutment against the support members 44, and, further, the damper elements 46 exert the damping forces when the valve body is quickly closed. Even when the lock member 45 is brought into abutment against the support members 44, the sleeve 47 is displaced by the displacement −x4 toward the direction away from the electric motor 1, and the portion of the second biasing member 42 on the electric motor 1 side with respect to the lock member 45 is compressed toward the first direction. Moreover, the biasing force F2A(x4−Δx) is generated in the portion of the second biasing member 42 on the electric motor 1 side with respect to the lock member 45. The generated biasing force F2A(x4−Δx) acts on the support members 44 through the lock member 45 as a force corresponding to a remaining part of the equivalent mass obtained by converting the large rotational inertia to the translational mass, and are released to a housing 40 through the support members 44. The fourth embodiment is configured so that the impact load is released not only to the second biasing member 42 but also to a valve-body side fixed plate 40B forming the housing 40 through the support members 44, and the load on the valve body is thus mitigated. That is, a part of the impact load is mitigated, and the mitigated impact load acts on the valve body as a force substantially equal to the biasing force F2B(Δx) until the lock member 45 abuts against the support members 44. Moreover, after the lock member 45 abuts against the support members 44, remaining portions F2A(x4−Δx)−F2B(Δx) of the impact load are mitigated and released to the valve-body side fixed plate 40B through the support members 44. The mechanism of the relative displacement of the sleeve 47, and the support members 44 and the lock member 45 mitigate the considerably high impact load caused by the rotational inertia, and a damage of the components including the electric motor 1, the conversion mechanism 43, and the valve body or fatigue accumulation at an undesirable level can thus be prevented. Further, the damping forces of the damper elements 46 can suppress the rebounds of the second biasing member 42, and the normal closed state can quickly be achieved.

The electrically driven actuator 400 for opening and closing a valve according to the fourth embodiment of the present invention has both of the effects of the above-mentioned second embodiment and third embodiment. Thus, according to the fourth embodiment of the present invention, the electrically driven actuator 400 for opening and closing a valve which secures the failsafe function having the high durability and reliability can be provided.

Application Example

Figure 8A:
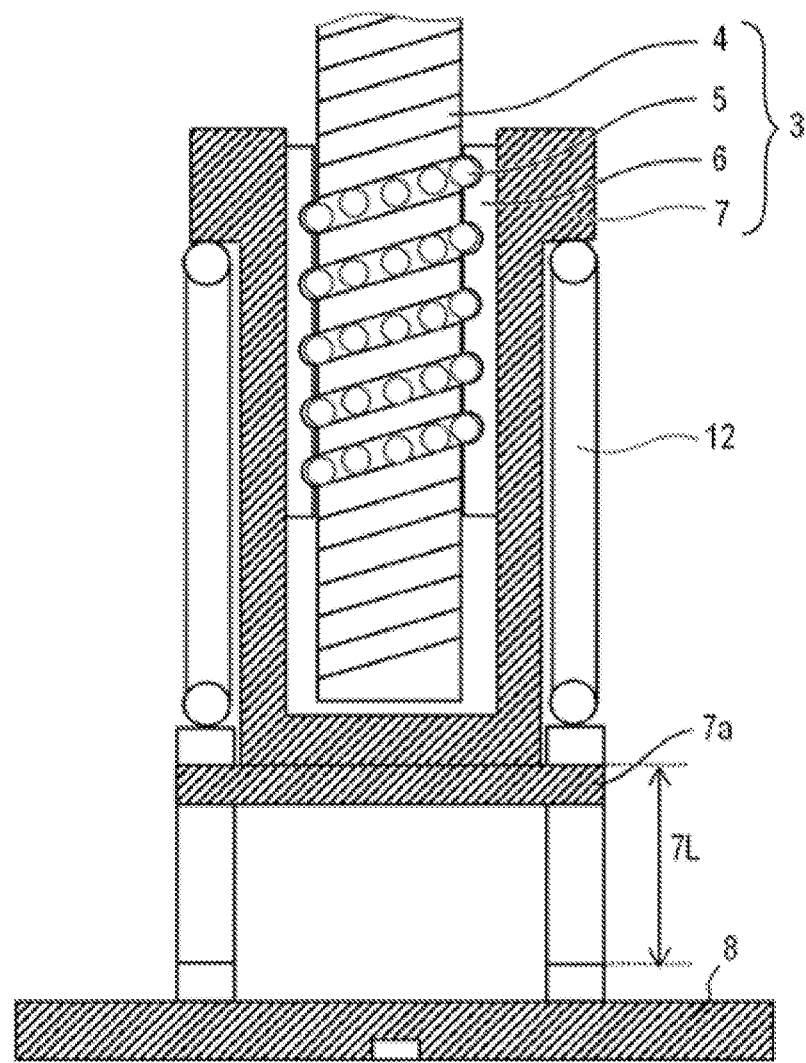
FIG. 8A is a sectional view for illustrating break-in of the electrically driven actuator 100 for opening and closing a valve according to the present invention.
Figure 8B:
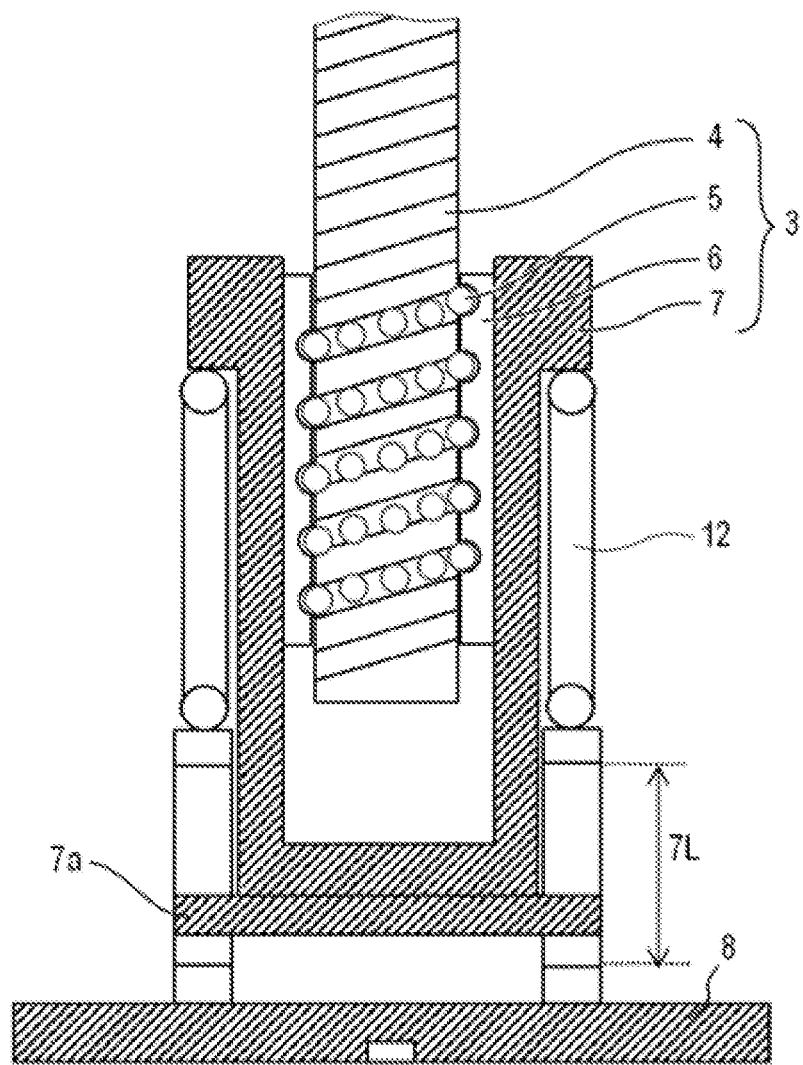
FIG. 8B is a sectional view for illustrating the break-in of the electrically driven actuator 100 for opening and closing a valve according to the present invention.

Description is now given of an application example in which the relative displacement of the conversion mechanism 3 of the electrically driven actuator 100 for opening and closing a valve according to the present invention is applied to break-in. FIG. 8A and FIG. 8B are sectional views for illustrating the break-in through use of the relative displacement of the conversion mechanism 3.

When the electrically driven actuator 100 for opening and closing a valve is started (cold-started) after the operation has been stopped for a long period particularly in a cold region or the like, in some cases, the viscosity of the grease may be high due to a low temperature of the grease for lubrication and a microscopic net structure formed by thickener in the grease. This high viscosity has such a problem that the operation during the drive and the operation for the closing by the failsafe function of the electrically driven actuator 100 for opening and closing a valve are greatly delayed. In order to prevent these operation delays, using an additional warming device such as a heater to actively heat members lubricated by the grease is conceivable, but a problem of additional cost and space and the like may occur. Executing the break-in through reciprocating drive in the range of the relative displacement of the sleeve 7 of the conversion mechanism 3 without influence on the closed state of the valve body is useful as means that does not require the addition of a warming device, or achieves sufficient cold start even when an output of a warming device is low.

In order to execute this reciprocating drive, the configuration that the sleeve 7 of the conversion mechanism 3 can be displaced with respect to the movable plate 8 is used to intentionally reciprocate the sleeve 7 by the driving torque of the electric motor 1 in the movement range 7L of the relative movement in the state in which the valve body is closed (a valve closing force is maintained). Particularly, as illustrated in FIG. 8B, the sleeve 7 is intentionally moved downward, and, after that, the reciprocating motion is repeated in a range in which the absolute value of the relative displacement is always larger than zero. Break-in in which the ball screw mechanism or the roller screw mechanism, the ball bearing 2B, and the like including the grease are moved by the reciprocating motion of the sleeve 7, to thereby stir the grease for the lubrication so that fluidity is increased can be provided.

Figure 9:
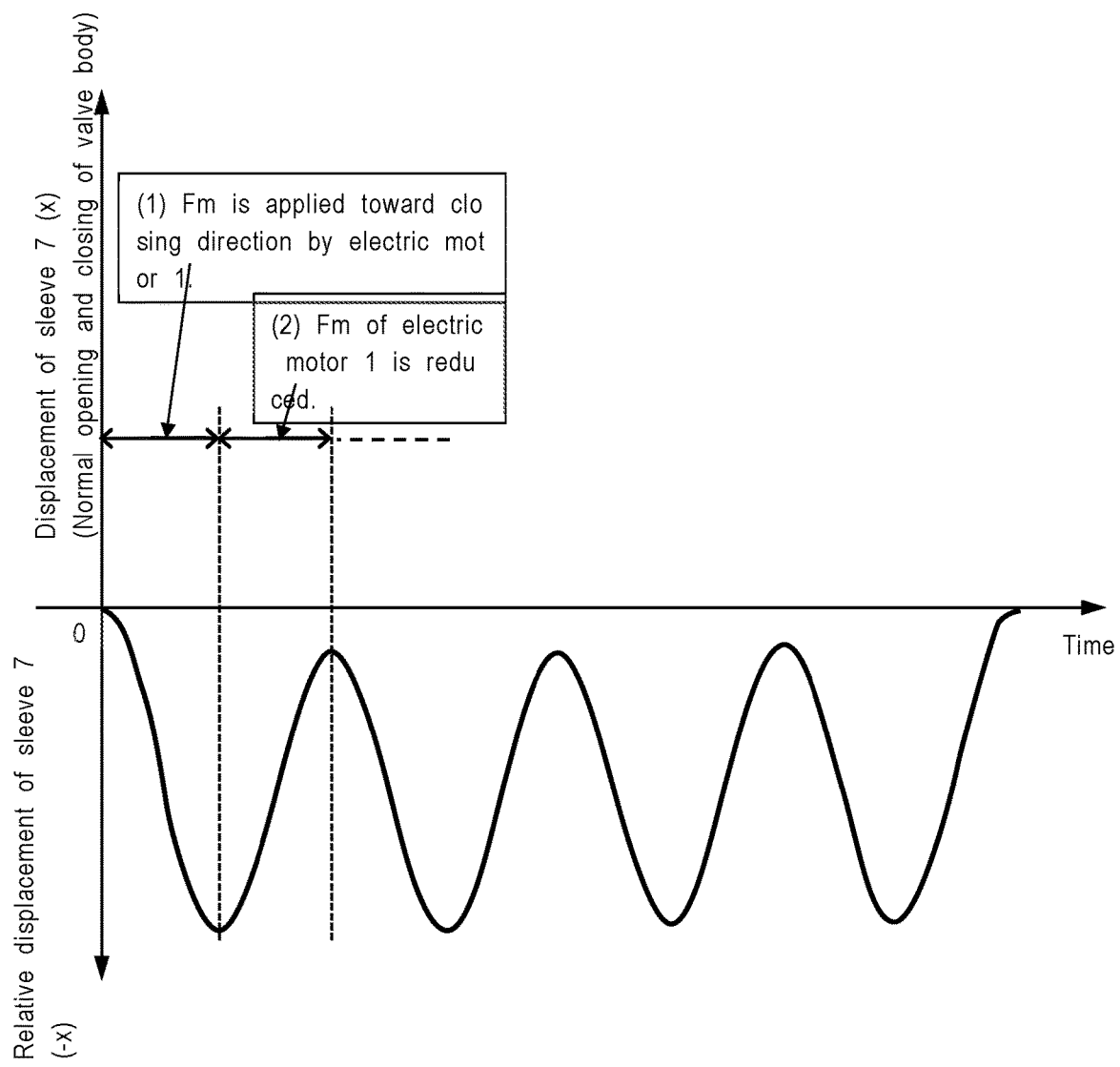
FIG. 9 is a graph for showing a break-in mode of the electrically driven actuator 100 for opening and closing a valve according to the present invention.

With reference to FIG. 9, description is now given of a break-in mode in which the break-in is executed. FIG. 9 is a graph of a cyclic operation of the electric motor 1 for showing the break-in mode. The horizontal axis represents the time. The vertical axis represents the displacement "x" of the sleeve 7. In a range in which the displacement "x" of the sleeve 7 is positive, the sleeve 7 operates to open and close the valve body. In a range in which the displacement "x" is negative, the sleeve 7 is relatively displaced. In the break-in, first, an operation (1), in which the linear driving force Fm is applied toward the closing direction by the electric motor 1, and an operation (2), in which the linear driving force Fm of the electric motor 1 is reduced, are repeated in the closed state of the valve body. That is, the operation (1) is an operation of driving the electric motor 1, to thereby displace the sleeve 7 toward the closing direction (lower direction) through use of the linear driving force Fm against the biasing force F2x of the second biasing members 12. Moreover, the operation (2) is an operation of reducing the linear driving force Fm of the electric motor 1, to thereby displace the sleeve 7 toward the direction (upper direction) opposite to the closing through use of the biasing force F2x of the second biasing members 12. The electric motor 1 is cyclically driven to repeat these operations (1) and (2), to thereby increase the fluidity of the grease inside the conversion mechanism 3, the ball bearing 2B, and the like.

The break-in mode is executed based on a method of driving the electrically driven actuator 100 for opening and closing a valve in accordance with conditions such as a condition of use and a region of use of the electrically driven actuator 100 for opening and closing a valve. The execution of this break-in provides an excellent effect that a response time of the normal operation and a failsafe operation time after the cold start are greatly reduced. As a result, the electrically driven actuator 100 for opening and closing a valve which secures the highly reliable failsafe function can be provided. Moreover, it should be understood that the break-in can also be applied to the electrically driven actuators for opening and closing a valve according to the second to fourth embodiments.

Moreover, the electrically driven actuators for opening and closing a valve according to the respective embodiments are described while assuming that the valve body is closed in case of emergency, but the present invention is not limited to this case, and it should be noted that the electrically driven actuators for opening and closing a valve can be applied to a usage in which the valve body is opened in case of emergency. When the valve body is emergently opened in case of emergency, damage and breakage of the valve body or other components due to collision of the valve body at an opening limit position or the like can be prevented or the fatigue accumulation can be mitigated by the electrically driven actuators for opening and closing a valve. Moreover, the same effects as those in the respective embodiments can be obtained.

In the description of the specification, the present invention is described while the directions are specified by the expressions such as up, down, left, and right. However, it should be noted that they are for the convenience of the description based on the illustration of the drawings accompanying the specification, and do not define the direction of the arrangement of the device according to the present invention.

This application claims the benefit of priority from Japanese Patent Application No. 2018-170077, filed on Sep. 11, 2018, the content of which is incorporated herein by reference.

REFERENCE SIGNS LIST 1 electric motor
3, 23, 33, 43 conversion mechanism
4 screw portion (ball screw mechanism)
5 ball (ball screw mechanism)
6 nut portion (ball screw mechanism)
7, 27, 37, 47 sleeve
7a engagement portion
8, 28, 38, 48 movable plate
9 engaged member
9d slide portion
10, 20, 40 housing
10A electric-motor side fixed plate (housing)
10B, 20B, 40B valve-body side fixed plate (housing)
10C main body portion (housing)
11, 21, 31, 41 first biasing member (coil spring)
12, 22, 32, 42 second biasing member (disk spring)
24, 44 support member (stopper member)
25, 45 lock member (washer member)
36, 46 damper element
100, 200 electrically driven actuator for opening and closing valve
300, 400 electrically driven actuator for opening and closing valve
Fm linear driving force
Δx gap

The invention claimed is:

1. An electrically driven actuator for opening and closing a valve comprising:
an electric motor;
a movable plate, to which a valve body is connected;
a conversion mechanism configured to convert a rotational motion of the electric motor to a linear motion;
a first biasing member configured to bias the movable plate toward a first direction; and
a second biasing member configured to bias the conversion mechanism toward a second direction,
wherein the valve body is to be opened when a part of the conversion mechanism linearly moves to move the movable plate toward the second direction, and is to be closed when the first biasing member biases the movable plate toward the first direction,
wherein the conversion mechanism is configured to be displaced relative to the movable plate in a state in which the valve body is closed,
wherein the conversion mechanism is formed of a ball screw mechanism or a roller screw mechanism and a sleeve,
wherein the movable plate includes an engaged member having a slide portion, and
wherein the sleeve includes an engagement portion, the engagement portion being configured to be brought into slide contact with the slide portion, and to engage with the engaged member, and the engagement portion being driven toward the second direction to move the movable plate, to thereby open the valve body.

2. The electrically driven actuator for opening and closing a valve according to claim 1, wherein a rotational driving force of the electric motor is converted to a linear driving force by the conversion mechanism, and the linear driving force is transmitted to the movable plate through the second biasing member, to thereby accelerate a closing operation of the valve body.

3. The electrically driven actuator for opening and closing a valve according to claim 1, wherein the conversion mechanism is configured to relatively be displaced along an axis substantially at a center portion of the movable plate with respect to a motion of the movable plate.

4. The electrically driven actuator for opening and closing a valve according to claim 1, wherein a spring stiffness of the second biasing member is higher than a spring stiffness of the first biasing member.

5. The electrically driven actuator for opening and closing a valve according to claim 1, wherein the first biasing member comprises a coil spring, the second biasing member comprises a disk spring, and the second biasing member is arranged between the conversion mechanism and the movable plate.

6. The electrically driven actuator for opening and closing a valve according to claim 1, wherein the first direction is a direction toward which the valve body closes, and the second direction is a direction toward which the valve body opens.

7. The electrically driven actuator for opening and closing a valve according to claim 1, wherein the valve body is configured to be quickly moved toward the first direction, and to be seated, and the conversion mechanism is configured to be displaced relative to the movable plate, to thereby compress the second biasing member, resulting in mitigating an impact load caused by rotational inertia including the electric motor when supply of power to the electric motor is lost, when the supply of power fails, or when an automatic or manual trigger is activated by abnormality detection in a state in which the valve body is opened.

8. The electrically driven actuator for opening and closing a valve according to claim 7, further comprising:
a support member fixed to a housing; and
a lock member arranged at a predetermined position of the second biasing member,
wherein the support member and the lock member are arranged across a slight gap in the state in which the valve body is closed, and the support member and the lock member are configured to be brought into abutment against each other when the second biasing member is compressed.

9. The electrically driven actuator for opening and closing a valve according to claim 8, wherein the support member comprises at least one stopper member provided so as to pass through the movable plate, and the lock member comprises a washer member in abutment against the support member.

10. The electrically driven actuator for opening and closing a valve according to claim 8, wherein the support member and the lock member are configured to be brought into abutment against each other to release the impact load remaining after the mitigation to the housing through the support member and the lock member, to thereby mitigate load on the valve body.

11. The electrically driven actuator for opening and closing a valve according to claim 1, wherein the second biasing member comprises a ring spring, and is configured to suppress a rebound of the second biasing member.

12. The electrically driven actuator for opening and closing a valve according to claim 1, further comprising a damper element, wherein the damper element is configured to suppress the rebound of the second biasing member.

13. The electrically driven actuator for opening and closing a valve according to claim 12, wherein the damper element is connected to the conversion mechanism and the movable plate, and is configured to suppress the rebound of the second biasing member when the conversion mechanism is displaced relative to the movable plate.

14. A method for driving an electrically driven actuator for opening and closing a valve comprising:
an electric motor;
a movable plate, to which a valve body is connected;
a conversion mechanism configured to convert a rotational motion of the electric motor to a linear motion;
a first biasing member configured to bias the movable plate toward a first direction; and
a second biasing member configured to bias the conversion mechanism toward a second direction,
wherein the valve body is to be opened when a part of the conversion mechanism linearly moves to move the movable plate toward the second direction, and is to be closed when the first biasing member biases the movable plate toward the first direction,
wherein the conversion mechanism is configured to be displaced relative to the movable plate in a state in which the valve body is closed,
wherein the conversion mechanism is formed of a ball screw mechanism or a roller screw mechanism and a sleeve,
wherein the movable plate includes an engaged member having a slide portion, and
wherein the sleeve includes an engagement portion, the engagement portion being configured to be brought into slide contact with the slide portion, and to engage with the engaged member, and the engagement portion being driven toward the second direction to move the movable plate, to thereby open the valve body, the method comprising:
executing break-in of the conversion mechanism to cyclically drive the electric motor, to thereby displace the conversion mechanism relative to the movable plate in a state in which the valve body is closed.

15. The method for driving the electrically driven actuator for opening and closing a valve according to claim 14, wherein a break-in mode of executing the break-in is further provided.

16. An electrically driven actuator for opening and closing a valve comprising:
a housing;
an electric motor provided outside the housing;
a movable plate accommodated in an internal space of the housing, to which a valve body is connected;
a conversion mechanism configured to convert a rotational motion of the electric motor configured as a servo motor to a linear motion and configured to connect a shaft of the electric motor;
a first biasing member configured to bias the movable plate toward a first direction; and
a second biasing member configured to bias the conversion mechanism toward a second direction,
wherein the conversion mechanism includes a sleeve having a groove therein,
wherein the shaft has a screw portion, and rotation of the screw portion is converted to linear motion for driving the sleeve in an up-and-down direction through a plurality of rolling members which arranged between the screw portion and the groove of the sleeve,
wherein the movable plate includes an engaged member having a slide portion,
wherein the sleeve includes an engagement portion, the engagement portion being configured to be brought into slide contact with the slide portion, and to engage with the engaged member,
wherein the second biasing member is arranged between the sleeve and the engaged member,
wherein the valve body is to be opened when the sleeve linearly moves to move the movable plate toward the second direction, and is to be closed when the first biasing member biases the movable plate toward the first direction, and
wherein the sleeve is configured to be displaced relative to the movable plate in a state in which the valve body is closed.

* * * * *